United States Patent
Santa Cruz et al.

[11] Patent Number: 5,988,962
[45] Date of Patent: Nov. 23, 1999

[54] ACCESSORY LOCK DEVICE FOR A LOAD BRACING BAR

[76] Inventors: Cathy D. Santa Cruz, 401 Canyon Way, #43, Sparks, Nev. 89434; Jeffrey C. Moore, 495 Sycamore, Fernley, Nev. 89408

[21] Appl. No.: 09/061,670

[22] Filed: Apr. 16, 1998

[51] Int. Cl.[6] ................................................... B60P 7/15
[52] U.S. Cl. .................... 410/151; 410/121; 410/143; 410/127
[58] Field of Search ................................ 410/143, 151, 410/121, 155, 127, 144, 150, 122, 129; 211/105.3; 248/354.1; 224/551, 552

[56]         References Cited
         U.S. PATENT DOCUMENTS

| | | |
|---|---|---|
| 3,699,898 | 10/1972 | Nolan . |
| 4,434,970 | 3/1984 | Boland . |
| 4,650,383 | 3/1987 | Hoff ................................ 410/150 X |
| 4,737,056 | 4/1988 | Hunt .................................... 410/151 |
| 5,028,185 | 7/1991 | Shannon ............................. 410/151 |
| 5,082,404 | 1/1992 | Stewart et al. ...................... 410/127 |
| 5,094,576 | 3/1992 | Fredelius ............................ 410/151 |

*Primary Examiner*—Stephen T. Gordon

[57] ABSTRACT

An accessory lock device which when combined with a pre-existing load-bracing bar, will stabilize a cargo load in a much more secure manner. Thus eliminating shifting of the load in substantially any direction, namely forward, rearward, or sideways.

12 Claims, 2 Drawing Sheets

ACCESSORY LOCK DEVICE FOR A LOAD BRACING BAR

FIELD OF THE INVENTION

The present invention relates to accessory items that are removably attachable to a pre-existing prior art load-bracing bar. But more particularly relates to a device which when combined with the bracing bar, will stabilize a load in a much more secure manner. Thus eliminating shifting of the load in any direction, namely forward, rearward, or sideways.

BACKGROUND OF THE INVENTION

Bracing bars are well known within the prior art and are most often utilized within cargo compartments. For example, they can be used within a cargo transport truck, within ships, or even used within trains, etc.

Unfortunately, all of the known bracing bars found by the applicants are only functional for stabilizing a load from shifting in a forward or backward direction. Examples of such bracing bars are taught within U.S. Pat. Nos. #4,434,970, #4,473,331, and #5,094,576. All of which are not functional for stabilizing a load from shifting sideways. This is an inherent problem with each of the noted references and the present invention recognizes this problem, addresses it, and overcomes it in a manner heretofore not taught within the prior art.

It is well known when transporting cargo within a transport truck, that the weight of the cargo must be distributed equally over the axles, so as to comply with strict trucking regulations. This can be most difficult if the load to be transported is only a partial load, which will not completely fill the truck bed when loaded. Therefore, the load must be positioned in the nose of the truck, within the rear of the truck, or at any other position of choice that will distribute the weight in the proper, legal manner.

SUMMARY AND OBJECTS OF THE INVENTION

It is therefore an object of the present invention to provide an accessory lock device that is removably attachable to a pre-exiting load-bracing bar. Whereby, the lock device and the bar cooperate together to stabilize a cargo load, or the like, and eliminate shifting of the load in all directions.

It is a further object of the present invention to provide an accessory lock device that is easily attached and cooperates with substantially any prior art load-bracing bar.

It is another object of the present invention to provide an accessory lock device for a load-bracing bar that can stabilize a load in substantially any location of choice.

It is yet another object of the present invention to provide an accessory lock device for a load-bracing bar that is of simple construction, is inexpensive to manufacture, and is also easily marketable.

It is another object of the present invention to provide an accessory lock device for a load-bracing bar that will minimize freight damage.

Still a further object of the present invention is to provide an accessory lock device for a load-bracing bar that will reduce driver tension, as they need not worry about shifting of the load in any direction.

Yet another important object of the present invention is to provide a method of use, or method of installation for the accessory lock device and load-bracing bar.

A very important object of the present invention is to provide an accessory lock device for a load-bracing bar that allows the weight of a cargo load to be distributed over the axles, so as to comply with trucking regulations.

It is yet another object of the present invention is to provide an accessory lock device for a load-bracing bar that will not mar or damage the load-bracing bar in anyway.

Still a further object of the present invention is to provide an accessory lock device for a load-bracing bar that can be made from substantially any suitable material of engineering choice, such as metal, plastic, wood, or the like.

Also, another object of the present invention is to provide an accessory lock device for a load-bracing bar that can be used singly, or in multiples.

Other objects and advantages will be seen when taken into consideration with the following specification and drawings.

DETAILED DESCRIPTION OF THE DRAWINGS

As shown throughout the various views, (arrow 10) represents an overview of the present invention, which is substantially an accessory lock device that is removably attachable to a preexisting prior art load-bracing bar (12). Load bar (12) can be substantially any load bar of choice, such as the load bar taught within U.S. Pat. No. 4,434,970, which is manufactured by Aeroquip Corporation in Jackson, Mich.

Figure 1:
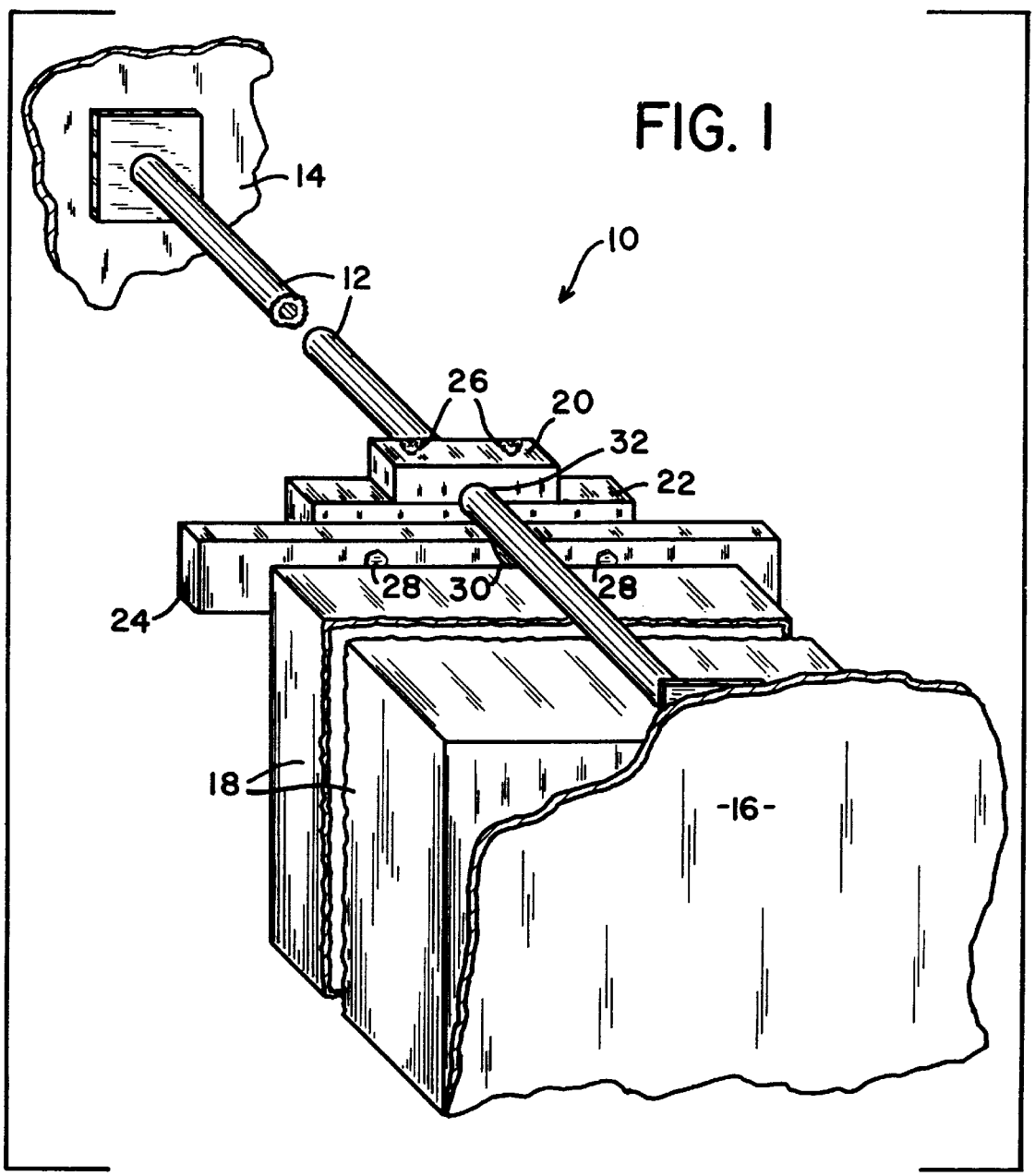
FIG. 1 is substantially a plan view for the present invention.

Referring now to FIG. 1, wherein we show substantially a plan view using one accessory lock device. It is to be noted that the load bar (12) can be installed between substantially any two opposing support surfaces, such as either (14) or (16). For example, the bar (12) can be positioned between the hull walls of a boat, between the walls within a train cargo car, or between the walls within the bed of a cargo truck, etc.

The present lock device (arrow 10) is of simple construction, and each of the components can be made from substantially any suitable material of engineering choice, such as metal, nylon, plastic, rubber, fiberglass, etc.

The lock device of the present invention (arrow 10) when used in combination with load bar (12), supports and secures an object (18) in place, in a manner heretofore not taught. It is to be noted that any object of choice may be supported, such as a cargo container, or the like.

The lock device includes substantially a first top member (20), a first bottom member (22) and an elongated support bar (24).

First top member (20) having attachment means for removably adjustably attaching the first top member (20) to first bottom member (22). It is to be noted any suitable type of attachment means of engineering choice may be used. For example, first top member (20) may include a first and a second threaded bore therein, and first bottom member (22) may include a first and a second threaded bore therein. With each first bore being substantially in alignment with each other, and each second bore being substantially in alignment with each other. Each of the first bores of members (20 & 22), being of a shape and size to accept a first threaded screw therein. Each of the second bores of members (20 & 22), being of a shape and size to accept a second threaded screw therein, and each screw being secured in place by a wing nut (26). Thus, first top member (20) and first bottom member (22) are now removably attached together.

First bottom member (22) having attachment means for removably adjustably attaching the first bottom member (22) to the first elongated support bar (24). It is to be noted any suitable type of attachment means of engineering choice may be used. For example, first bottom member (22) may include a first and a second threaded bore therein, and first elongated support bar (24) may include a first and a second threaded bore therein. With each first bore of members (22 & 24) being substantially in alignment with each other, and each second bore of members (22 & 24) being substantially in alignment with each other. Each of the first bores of members (22 & 24), being of a shape and size to accept a first threaded screw therein. Each of the second bores of members (22 & 24), being of a shape and size to accept a second threaded screw therein, and each screw being secured in place by a nut (28). Thus, first elongated support bar (24) and first bottom member (22) are now removably attached together.

First elongated support bar (24) includes substantially a recess (30) which is of a shape and size to receive the load bracing bar (12) there through. It is to be noted that recess (30) can be of any suitable shape and size of engineering choice.

First top member (20) and first bottom member (22) in combination substantially form a first circular cavity (32) which is of a shape and size to removably adjustably receive the load bracing bar (12) there through.

As shown in FIG. 1, it will now be seen when load bracing bar (12) is removably adjustably positioned between the first support surface (14) and the second support surface (16), the first support bar (24) is substantially spaced apart from the second support surface (16). Thus, forming a space there between, and the space is substantially of a size and shape to receive the object (18), such as a cargo container, therein. Whereby, each member (20 & 22) and each bar (12 & 24) cooperate together in combination to support and secure the object (18) in place. Therefore, the object (18) can be positioned and secured at the desired location of choice.

Figure 2:
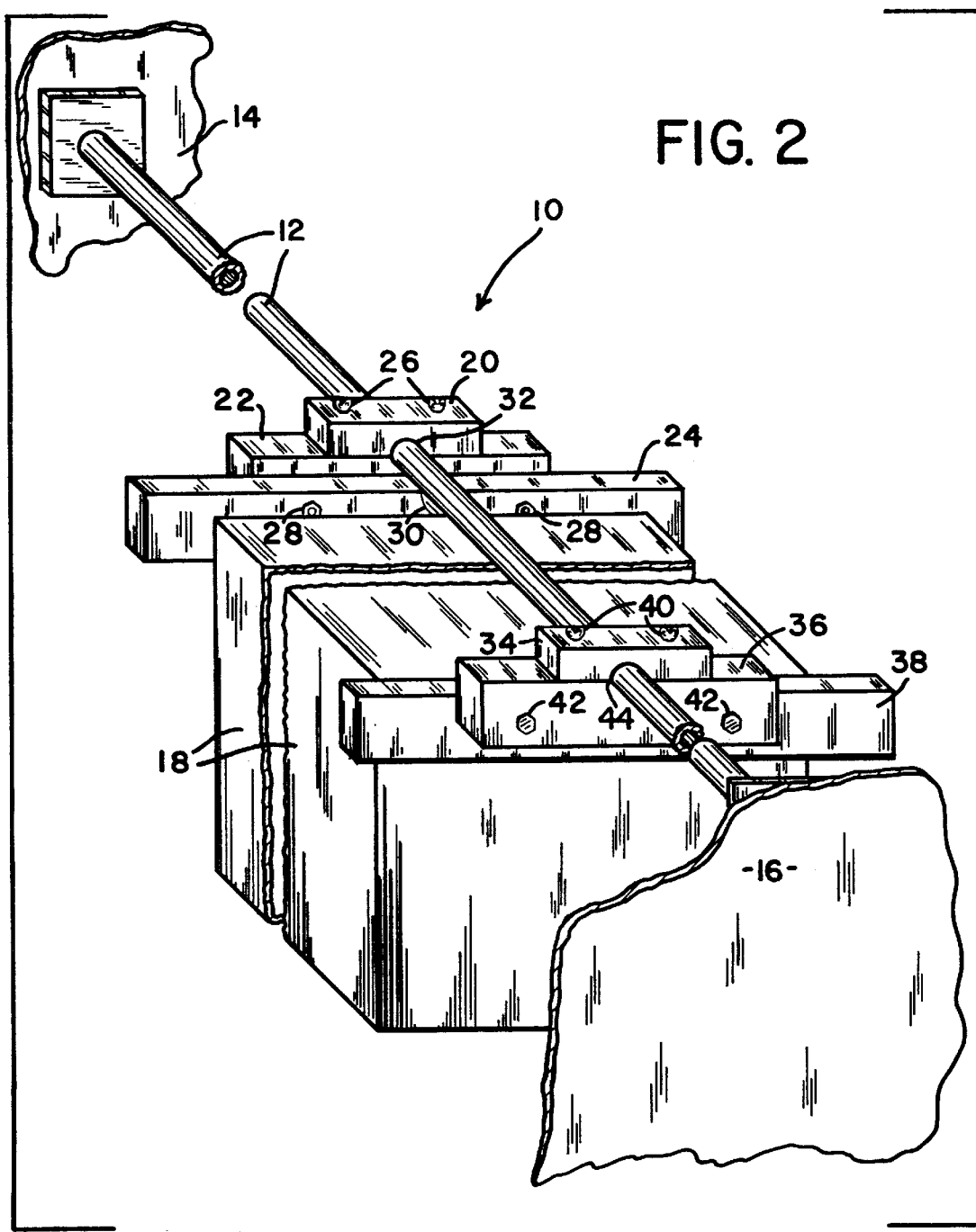
FIG. 2 is substantially a second plan view showing two accessory devices in combination.

Within FIG. 2, we show two accessory lock devices in combination that cooperate together to secure the object (18) at a different location of choice. Therefore, the lock device now includes a first top member (20), a first bottom member (22), a second top member (34), a second bottom member (36), a first elongated support bar (24) and a second elongated support bar (38). It is to be noted that the first lock device is positioned and attached in place as described above and the second lock device is positioned and attached as follows:

Second top member (34) includes attachment means for removably adjustably attaching the second top member (34) to the second bottom member (36). It is to be noted any suitable attachment means of engineering choice may be used. For example, second top member (34) may include a first and a second threaded bore therein. Second bottom member (36) includes a first and a second bore therein. The first bore of each member (34 & 36) being substantially in alignment with each other and the second bore of each member (34 & 36) being substantially in alignment with each other. Each first bore of members (34 & 36) being of a shape and size to accept a first threaded screw therein. Each second bore of members (34 & 36) being of a shape and size to accept a second threaded screw therein, and each screw being secured in place by a wing nut (40). The second bottom member (36) having attachment means for removably attaching the second elongated support bar (38) to the second bottom member (36). It is to be noted any suitable attachment means of engineering choice may be used. For example, second bottom member (36) may include a first and a second bore therein and second elongated support bar (38) may include a first and a second bore therein. Each first bore of second bottom member (36) and second elongated support bar being substantially in alignment with each other. Each second bore of second bottom member (36) and second elongated support bar being substantially in alignment with each other. Each first bore of second bottom member (36) and second elongated support bar (38) being of a shape and size to accept a first threaded screw (42) therein. Each second bore of second bottom member (36) and second elongated support bar (38) being of a shape and size to accept a second threaded screw (42) therein, and each screw being secured in place by a nut. Each support bar (24 & 38) having a recess (30) which is of a shape and size to receive the load bracing bar (12) there through. Second top member (34) and second bottom member (36) in combination substantially form a second cavity (44) which is of a shape and size to removably adjustably receive the load bracing bar (12) there through.

It will now be seen when the load bracing bar (12) is removably adjustably positioned between the first support surface (14) and the second support surface (16). The first support bar (24) and the second support bar (38) are substantially spaced apart from each other, forming a space there between which is of a shape and size to receive the object (18), such as a cargo container, therein. And the first support member (24) and the second support member (38) are substantially aligned and opposed to each other. Whereby, each member (20, 22, 34, & 36) and each bar (12, 24 & 38) cooperate together in combination to support and secure the object (12) in place.

Figure 3:
FIG. 3 is substantially a partial view showing a rubber insert.

Referring now to FIG. 3, wherein we show first cavity (32) further having a protective insert (46). It is to be noted that insert (46) can be made from substantially any suitable material of choice, such as rubber or the like. Insert (46) is most advantageous as it not only eliminates undesirable slipping of load bracing bar (12) but it also provides protection so as not to damage the load bracing bar (12) when positioned therein.

Figure 4:
FIG. 4 is substantially a partial view showing a second rubber insert.

Referring now to FIG. 4 wherein we show recess (30) further having a protective insert (48), which also provides the advantages as pointed out above.

It is to be noted we herein provide a method for attaching an accessory lock device (arrow 10) to a load bracing bar (12). Wherein the lock device and bar (12) cooperate together in combination to stabilize object (18) in a secure manner, with the method comprising the following steps of:

a. positioning object (18) into a location of choice, with object (18) being located in substantially a flush manner with either a first support surface (14) or a second support surface (16);

b. installing load bracing bar (12) on top of object (18);

b. positioning first elongated support bar (24) substantially next to first bottom member (22) of the device;

d. inserting a first threaded screw into first bottom member (22) and into first elongated support bar (24);

e. inserting a second threaded screw into first bottom member (22) and into first elongated support bar (24), thus attaching first bottom member (22) to first elongated support bar (24);

f. positioning first elongated support bar (24) at a location of choice substantially next to object (18);

g. positioning first top member (20) of the device at a location of choice on load bracing bar (12), with first top member (20) being substantially aligned with first bottom member (22);

h. inserting a first threaded screw into first top member (20) and into first bottom member (22); and;

i. inserting a second threaded screw into first top member (20) and into first bottom member (22), thus attaching first top member (20) to first bottom member (24).

We further provide a method for attaching a first and a second accessory lock device to a load bracing bar (12), and each lock device and bar (12) cooperate together in combination to stabilize an object (18) in a secure manner, with the method comprising the following steps of:

a. positioning object (18) between a first support surface (14) and a second support surface (16) at a location of choice;

b. installing load bracing bar (12) on top of object (18);

c. positioning a first elongated support bar (24) substantially next to a first bottom member (22) of the device;

d. inserting a first threaded screw into first bottom member (22) and into first elongated support bar (24);

e. inserting a second threaded screw into first bottom member (22) and into first elongated support bar (24), thus attaching first bottom member (22) to first elongated support bar (24);

f. positioning first elongated support bar (24) at a location of choice on one side of object (18);

g. positioning a first top member (20) of the device at a location of choice on load bracing bar (12), with first top member (20) being substantially aligned with first bottom member (22);

h. inserting a first threaded screw into first top member (20) and into first bottom member (22);

i. inserting a second threaded screw into first top member (20) and into first bottom member (22), thus attaching first top member (20) to first bottom member (22);

j. positioning a second elongated support bar (38) substantially next to a second bottom member (36) of the device;

k. inserting a first threaded screw into second bottom member (36) and into second elongated support bar (38);

l. inserting a second threaded screw into second bottom member (36) and into second elongated support bar (38); thus attaching second bottom member (36) to second elongated support bar (38);

m. positioning a second top member (34) of the device at a location of choice on load bracing bar (12), with second top member (34) being substantially aligned with second bottom member (36), and first top member (20) being substantially opposed to second top member (34);

n. inserting a first threaded screw into second top member (34) and into second bottom member (36); and;

o. inserting a second threaded screw into second top member (34) and into second bottom member (36), thus attaching second top member (34) to second bottom member (36).

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described our invention, what we claim as new and wish to secure by Letters Patent is:

1. An accessory lock device for a load bracing bar comprising: a first top member; a first bottom member; and a first elongated support bar; said first top member having a first attachment means for removably adjustably attaching said first top member to said first bottom member, said first bottom member having a second attachment means for removably attaching said first elongated support bar to said first bottom member, said support bar having a recess which is of a shape and size to receive a load bracing bar there through, said first top member and said first bottom member in combination substantially form a first cavity which is of a shape and size to removably adjustably receive said load bracing bar there through, said load bracing bar being removably adjustably positionable between a first support surface and a second support surface, said first support bar being substantially spaced apart from either said first support surface or said second support surface, thus forming a space there between, and said space being substantially of a size and shape to receive an object therein, whereby;

each said member and each said bar cooperate together in combination to support and secure said object in place.

2. The device of claim 1 wherein the first attachment means includes a first and a second threaded bore within said first top member, and a first and a second bore within said first bottom member, each said first bore being in alignment with each other, each said second bore being in alignment with each other, each said first bore receiving and being of a shape and size to accept a first threaded screw therein, each said second bore receiving and being of a shape and size to accept a second threaded screw therein, and each said screw being secured in place by a wing nut.

3. The device of claim 1 wherein the second attachment means includes a first and a second threaded bore within said first bottom member, and a first and a second threaded bore within said first elongated support bar, each said first bore being in alignment with each other, each said second bore being in alignment with each other, each said first bore receiving and being of a shape and size to accept a first threaded screw therein, each said second bore receiving and being of a shape and size to accept a second threaded screw therein, and each said screw being secured in place by a nut.

4. The device of claim 1 wherein said first and said second support surfaces each comprise a wall.

5. The device of claim 1 wherein said object is a cargo container.

6. The device of claim 1 wherein said recess includes a protective rubber insert.

7. The device of claim 1 wherein said cavity includes a protective rubber insert.

8. An accessory lock device for a load bracing bar comprising: a first top member; a first bottom member; a second top member; a second bottom member; a first elongated support bar; and a second elongated support bar; said first top member having a first attachment means for removably adjustably attaching said first top member to said first bottom member, said second top member having a second attachment means for removably adjustably attaching said second top member to said second bottom member, said first bottom member having a third attachment means for removably attaching said first elongated support bar to said first bottom member, said second bottom member having a fourth attachment means for removably attaching said second elongated support bar to said second bottom member, each said support bar having a recess which is of a shape and size to receive a load bracing bar there through, said first top member and said first bottom member in combination substantially form a first cavity which is of a shape and size to removably adjustably receive said load bracing bar there through, said second top member and said second bottom member in combination substantially form a second cavity which is of a shape and size to removably adjustably receive said load bracing bar there through, said load bracing bar being removably adjustably positionable between a first support surface and a second support surface, said first support bar and said second support bar being substantially spaced apart from each other forming a space there between, said first support bar and said second support bar being substantially aligned and opposed to each other, said space being substantially of a size and shape to receive an object therein, whereby;

each said member and each said bar cooperate together in combination to support and secure said object in place.

9. The device of claim 8 wherein the first attachment means includes a first and a second threaded bore within said first top member, a first and a second bore within said first bottom member, each said first bore being in alignment with each other, each said second bore being in alignment with each other, each said first bore being of a shape and size to accept a first threaded screw therein, each said second bore being of a shape and size to accept a second threaded screw therein, each said screw being secured in place by a wing nut, the second attachment means includes a first and a second threaded bore within said second top member, a first and a second bore within said second bottom member, each said first bore of said second top member and said second bottom member being in alignment with each other, each said second bore of said second top member and said second bottom member being in alignment with each other, each said first bore of said second top member and said second bottom member being of a shape and size to accept a first threaded screw therein, each said second bore of said second top member and said second bottom member receiving and being of a shape and size to accept a second threaded screw therein, and each said screw of said second top member and said second bottom member being secured in place by a wing nut.

10. The device of claim 8 wherein the third attachment means includes a first and a second threaded bore within said first bottom member, a first and a second threaded bore within said first elongated support bar, each said first bore being in alignment with each other, each said second bore being in alignment with each other, each said first bore receiving and being of a shape and size to accept a first threaded screw therein, each said second bore receiving and being of a shape and size to accept a second threaded screw therein, each said screw being secured in place by a nut, the fourth attachment means includes a first and a second threaded bore within said second bottom member, a first and a second threaded bore within said second elongated support bar, each said first bore of said second bottom member and said second elongated support bar being in alignment with each other, each said second bore of said second bottom member and said second elongated support bar being in alignment with each other, each said first bore of said second bottom member and said second elongated support bar receiving and being of a shape and size to accept a first threaded screw therein, each said second bore of said second bottom member and said second elongated support bar receiving and being of a shape and size to accept a second threaded screw therein, and each said screw of said second bottom member and said second elongated support bar being secured in place by a nut.

11. The device of claim 8 wherein said first and said second support surfaces each comprise a wall.

12. The device of claim 8 wherein said object is a cargo container.

* * * * *